United States Patent [19]

Fiala et al.

[11] Patent Number: 5,895,716
[45] Date of Patent: Apr. 13, 1999

[54] WET FRICTION MATERIALS, METHODS OF MAKING THEM, AND APPARATUS CONTAINING THE SAME

[75] Inventors: Robert A. Fiala, Long Beach, Calif.; William L. Tarasen, Clearwater, Fla.

[73] Assignee: The B.F. Goodrich Company, Richfield, Ohio

[21] Appl. No.: 08/588,958

[22] Filed: Jan. 19, 1996

Related U.S. Application Data

[60] Provisional application No. 60/001,480, Jul. 18, 1995.

[51] Int. Cl.$^6$ .................................................. B32B 9/00
[52] U.S. Cl. ...................... 428/408; 428/111; 428/107; 428/137; 428/196; 428/212; 428/366; 428/367; 428/395; 428/902; 524/495; 427/249; 427/255.2; 423/447.1; 264/29.4; 264/29.5; 264/29.7
[58] Field of Search ........................ 428/245, 260, 428/111, 196, 246, 262, 280, 288, 367, 395, 366, 408, 902, 107, 137, 212, 114; 156/155, 327; 423/447.1; 427/249, 255.2, 255.7; 524/495, 496; 264/29.4, 29.7, 29.5; 192/107 M

[56] References Cited

U.S. PATENT DOCUMENTS

| | | | |
|---|---|---|---|
| 3,730,320 | 5/1973 | Freeder et al. | 192/107 |
| 3,897,582 | 7/1975 | Olcott | 428/114 |
| 3,944,686 | 3/1976 | Froberg | 427/228 |
| 3,948,363 | 4/1976 | Ely | 188/71.1 |
| 3,991,248 | 11/1976 | Bauer | 428/245 |
| 4,100,322 | 7/1978 | Seibold et al. | 428/257 |
| 4,291,794 | 9/1981 | Bauer | 192/107 |
| 4,396,663 | 8/1983 | Mitchel et al. | 428/111 |
| 4,400,434 | 8/1983 | Santoso et al. | 428/421 |
| 4,700,823 | 10/1987 | Winckler | 192/107 |
| 4,766,013 | 8/1988 | Warren | 427/228 |
| 4,828,089 | 5/1989 | Collins et al. | 192/70.12 |
| 4,844,218 | 7/1989 | Genise | 192/53 |
| 4,846,326 | 7/1989 | Tilton et al. | 192/70.19 |
| 4,929,505 | 5/1990 | Washburn et al. | 264/92.4 |
| 5,033,596 | 7/1991 | Genise | 192/53 |
| 5,395,864 | 3/1995 | Miyoshi et al. | 523/155 |

OTHER PUBLICATIONS

Relationship Between Structure and Strength for CVD Carbon Infiltrated Substrates, D.W. Bauer, W.V. Kotlensky, Super–Temp Company, Presented at the 23rd Pacific Coast Regional Meeting Oct. 28–29, 1970.

*Primary Examiner*—William Krynski
*Assistant Examiner*—Abraham Bahta
*Attorney, Agent, or Firm*—David M. Ronyak

[57] ABSTRACT

This invention relates to carbon—carbon (C—C) composite comprising carbon fibers or carbon fabric, carbon char on the carbon fiber or fabric and pyrolytic carbon on the carbon char, wherein the density of the carbon composite is at least 1.3 g/cc. The invention also relates to wet friction elements and power transmission devises containing the same. The invention also relates to methods of preparing the carbon—carbon (C—C) composites. These C—C composites and wet friction elements and power transmission devises made therefrom have improved friction properties desired by wet brakes and clutches. These C—C composites provide improvements in cost, and when run against metals, such as steel or iron, improvements in wear and frictional behavior compared to known C—C composites for wet friction applications. In one aspect, the carbon—carbon does not require bonding to a metal backing or core material.

25 Claims, No Drawings

WET FRICTION MATERIALS, METHODS OF MAKING THEM, AND APPARATUS CONTAINING THE SAME

This application claims the benefit of U.S. Provisional Application No. 60/001,480, filed Jul. 18, 1995.

FIELD OF THE INVENTION

This invention relates to composite materials useful in wet friction applications. The invention also relates to methods of preparing the wet friction materials, elements and devices such as a power transmission using the materials.

BACKGROUND OF THE INVENTION

The use of carbon—carbon (C—C) composites as a dry friction material is well known in the aerospace industry. The majority of military and commercial aircraft which have been designed over the past 20 years have used C—C brake friction materials. U.S. Pat. No. 3,897,582, issued to Olcott, and U.S. Pat. No. 3,991,248, issued to Bauer, provide examples of the Chemical Vapor Deposition (CVD) processes used to fabricate C—C materials.

The maintenance of frictional properties while under extreme thermal loading and other advantages of the C—C composites have been recognized by the automobile racing community. U.S. Pat. No. 4,846,326, issued to Tilton et al, describes the use of C—C materials as high performance clutches.

Pyrolytic carbon material, e.g., pyrolytic carbon/fiber composites formed using pyrolytic carbon deposited on carbon fibers work well for wet friction applications. U.S. Pat. No. 4,291,794, issued to Bauer, U.S. Pat. No. 4,700,823, issued to Winckler, U.S. Pat. Nos. 4,844,218 and 5,033,596, issued to Genise, describe these openly porous carbonaceous materials and their use in wet friction devices. These materials are described as low density C—C composites, (e.g., 0.9–1.2 g/cc), made by the deposition of pyrolytic carbon on carbon fibers.

SUMMARY OF THE INVENTION

This invention relates to a carbon—carbon (C—C) composite comprising carbon fibers or carbon fabric, carbon char on the carbon fiber or fabric and pyrolytic carbon on the carbon char, wherein the density of the carbon composite is at least 1.3 g/cc. The invention also relates to wet friction elements and power transmission devices containing the same. The invention also relates to methods of preparing the carbon—carbon (C—C) composites.

The Carbon—Carbon composites and wet friction elements and power transmission devices made therefrom have improved friction properties desired by designers, manufacturers and users of wet brakes and clutches. The carbon—carbon composites provide improved chatter free results when run against itself or metals, such as steel or iron. The materials also provide improvements in wear, uniformity and cost over that of pyrolytic carbon on carbon fibers.

DETAILED DESCRIPTION OF THE INVENTION

As described above, the C—C composites are prepared from carbon fiber or fabric. The fibers may be prepared into a preform. The carbon fiber preform or fabric may be prepared from any fiber which may form carbon or graphite upon heating. The fibers include resin, rayon, PAN (polyacrylonitrile) fibers, pre-oxidized acrylonitrile resin fibers, pitch fibers, CVD carbon fibers, pyrolyzed natural fibers, such as pyrolyzed cotton fibers, and mixtures thereof. The fibers are arranged to form the carbon fiber preform in a manner known to those in the art. The preforms may be woven or nonwoven. The preforms may be formed from braided fibers, typically straight braided fibers. Braided fibers are described in U.S. Pat. No. 5,217,770, issued to Morris, Jr. et al. The carbon fiber preform may be 1D (one dimensional), 2D (two dimensional), needled 2D, or 3D (three dimensional). The preform may be that of a fabric, felt, needled preform, etc. and choice will be determined by the requirements and economics of the application. In one embodiment, the fibers or fabric do not have an open mesh, or any uniformly recurring mesh as the preforms are not woven. Typically, the amount of preform or fabric in the final composite is from about 20% to about 50% by volume, this amount being referred to as the fiber volume.

The carbon fiber preform or fabric is treated with a carbonaceous material. The carbonaceous material decomposes upon heating to form carbon char on or within the carbon preform or fabric. Those skilled in the art will readily determine sources of carbon char. In one embodiment, the carbonaceous material is a thermoset or thermoplastic polymer. Preferably the carbonaceous material is a thermoset polymer. Examples of carbonaceous materials include but are not limited to coal tar or petroleum pitches, phenolic resins, polyimide resins, furan resins, epoxy resins, and mixtures thereof. The carbon char is typically present in the final composite in an amount from about 10% to about 30% by weight.

In one embodiment, the carbonaceous material contains a carbonaceous filler. The filler is generally present in an amount from about 1% to about 20%, or from about 2% to about 10% by weight. In another embodiment, the carbonaceous filler is present in an amount from about 1% up to about 15% by volume, or from about 2% up to about 20% by volume. Here as well as elsewhere in the specification and claims, the range and ratio limits may be combined. Examples of carbonaceous fillers include carbon black, natural flake and synthetic graphite, pitch particles and needle and metallurgical cokes.

In another embodiment, the carbonaceous material contains a ceramic filler. The ceramic filler is generally present in an amount from 1% to about 25%, or from about 2% to about 15% by volume. In another embodiment, the filler is present in an amount from about 1% up to about 15% by volume, or from about 2% up to about 25% by volume. Examples of ceramic fillers include but are not limited to silicon carbide, boron carbide, zirconium oxide, aluminum oxide, and silicon nitride. Most refractory borides, carbides, nitrides and oxides that are stable within a carbon—carbon composite during processing and use, and would contribute to the frictional properties, would be useful as ceramic fillers. In one embodiment, the ceramic fillers have a particle size from about 60 to about 2000, or from 300 to about 1200 mesh.

The C—C composite typically has a thickness of greater than about 0.01. In one embodiment the C—C composite has a thickness from about 0.01 to about 0.5, or from 0.015 to about 2, or from about 0.02 to about 1.0. The composite may be formed from a single layer or multiple layers. Preferably the C—C composite is laminated to a defined thickness. Typically from one to ten plies are used in preparing the carbon fiber composite laminate.

The choice of resins, fillers, and their respective volume ratios in the component, are all variable and are used to control the final properties, cost and performance of the C—C composite.

As used in the specification and claims, voids refers to internal voids within the C—C composite. The voids are typically present in an amount of less than about 40%, preferably less than about 35%. Generally, the voids are present in the range from about 5% to about 40%, or from about 8% to about 35%, or from about 10% to about 30%. The amount of voids can be determined by liquid immersion density. Typically, the voids are interconnected so air and fluids may pass through the carbon composite. Typically, few voids extend through and pass light.

The process for making the C—C composites involves impregnating a carbon preform or fabric with a carbonaceous material, such as previously defined, curing the carbonaceous material, and heating the composite to a high temperature to form the carbon char and finally depositing pyrolytic carbon on the preform or fabric and carbon char by chemical vapor deposition.

The carbon preform or fabric is first impregnated by means known to those in the art, such as spraying, rolling, hot melt, dipping and calendaring, etc. The amount of carbonaceous material added to the fabric or fiber preform is controlled to an amount of about 20% to about 60% by volume, or from about 20% to about 50% by weight.

If a thermoset resin is used, it is common for the prepreg to be heated or "B" staged to advance the resin to a point where the material can be easily handled and used. The prepreg can then be cut into plies or pieces suitable for the lamination process.

One or more plies of the carbon preform or fabric prepreg is placed into a die, oven or press and cured at a temperature from about 250° F. to about 800° F. If a thermoplastic material is used, it is common for the material to be stabilized, rather than cured, by methods known in the art such as oxidative stabilization of mesophase pitches. In one embodiment, the impregnated preform or fabric is compressed, typically at a pressure from about 50 psi to about 200 psi.

An advantage of the process is that near net shapes may be cut from the impregnated and cured carbon preform or fabric prior to further processing. This avoids waste and reduces volume utilization in process equipment.

In one embodiment, the lamination is done by cutting sheets of fabric, stacking the desired number of plies, impregnating the stack with a carbonaceous material, and curing on a large platen press to the desired thickness and fiber volume. In another aspect, the lamination is made in a continuous process. The lamination may be made by a continuous impregnation of the carbonaceous material which is then cured and formed into coiled rolls. Multiple plies may be used to achieve the desired fiber volume and final thickness. Fiber volumes range from about 20% up to about 50% depending on the product.

The treated carbon preform or fabric is then densified in a chemical vapor deposition furnace. The densification process includes a heat up step wherein the carbonaceous material is reduced thermally to a carbon char. Densification may be accomplished by isothermal, isobaric CVI processing. Forced flow and/or delta temperature deposition methods may be used to assist in reducing processing time. Typically, the densification is accomplished in at least about 75 hours. The densification (chemical vapor deposition) is continued until the bulk density of the composite is greater than 1.3 or greater than 1.35 g/cc. In one embodiment, the composite has a density from 1.35 to about 1.7, or from about 1.4 to about 1.6 g/cc. The chemical vapor deposition is accomplished using pyrolytic carbon source, such as methane or natural gas.

One advantage of the process is packing individual friction elements onto graphite mandrels or graphite "cassettes" for efficient loading into CVD induction furnaces. Another benefit is that the individual friction elements may be easily separated. In another aspect, the total cost of the facing material as applied to the friction element on either a cost per pound or a cost per unit area was less than that of a rigidly controlled CVD'd fabric.

In another embodiment, the process involves (1) preparing prepreg rolls of woven (or non-woven) spun yarn carbon fabrics of areal weight ranging from about 3.0 to about 9.0 $oz/yd^2$, typically having a standard width of roll is from about 42" to about 60", by either a standard wet prepregging process, or alternatively, a dry powdered process, usually using a phenolic resin system at a content from about 30 to about 50 wt % of the prepregged fabric, and optionally laminating the fabric to a desired thickness from about 0.01" to about 0.08", (2) cutting out near net shapes of the final friction elements (3) performing an in-situ carbonization to pyrolyze the resin within the friction elements, (4) changing, in one embodiment without interrupting the process, to deposit carbon by chemical vapor deposition into the open matrix of each friction element such that the final density is greater than 1.3 g/cc. After CVD treatment, the materials are unloaded from the CVD furnace to assess weight pickup of each mandrel or cassette. The friction elements may be machined to a net thickness, or alternatively, breaking the CVD seal coat on one side for subsequent adhesive bonding. The friction elements may be bonded to steel and/or metal power transmission drive plates. Finally, the bonded device is machined to final thickness tolerances and may be grooved to provide fluid flow across the surface.

The following are examples of the C—C composites and methods of making the same. Unless otherwise indicated, here, as well as throughout the specification and claims, amounts are by weight, temperature is degrees celsius and pressure is atmospheric. The examples are illustrative and are not to be considered limiting.

EXAMPLE I

A carbon staple PAN fabric of plain weave construction as can be purchased from Zoltek Corp of St. Louis, Mo., having an areal weight of about 6 ounces per square yard, known and sold as PWB-6 is used. A phenolic resin from Borden, known and sold as SC-1008, is mixed with carbon black in a ratio of 75 weight percent resin solids to 25 percent carbon black. The resin/carbon black is placed on the fabric by a process known as prepregging. The resin is heated to advance the resin, known as "B" staging, and to produce a material which is easily handled. The prepreg material is then cut into 4 foot by 8 foot sheets and two layers of the sheets are laminated and molded into a composite. The molding is accomplished by applying a pressure of 100 psi and a temperature of 350° F. for a period of one hour which results in a solid and infusible laminate having a thickness of 0.015 inches per layer of prepreg and a total thickness of 0.030".

Multiple (up to 30) layers of laminate are then placed under a computer controlled water jet cutting tool which cuts 60 degree arc segments of the area inside a 9" circular disk with a 6" inside diameter. These segments are then stacked into a holding tool with 250 layers in each stack. Pressure is placed on the arc segments by clamping the stack. Multiple stacks are placed into each tool and multiple tools are then placed into a CVI furnace and are heated to about 1100° C. While holding the temperature constant, natural gas is feed into the furnace and pyrolytic carbon is deposited into the pores created by carbonization of the matrix resin during the heat up cycle. The gas is fed for a period of 150 hours after which the furnace is cooled and the tools are unloaded. The segments are weighed and found to increase in weight by 25% and attain a final density of 1.45 gm/cc.

A metal ring made from stamping a metal sheet, which ring may have gear teeth on the outside or inside diameter, is placed into a holder. A nitrile phenolic film adhesive, such as is available from BFGoodrich Adhesive Systems, is stamped into the 60 degree arc segment size and shape of the carbon—carbon segments. One arc segment of adhesive is placed on the metal ring and the metal ring is then rotated 60 degrees, followed by another adhesive arc segment placement, etc, until six segments are placed on the ring forming a complete circle. This process is repeated with the carbon—carbon arc segments being placed over the adhesive. A 325° F. heated press then pushes down into the holder to compress the carbon—carbon onto the adhesive, with a pressure of 100 psi.

The ring is then turned upside down and the process of adhesive and carbon—carbon placement is repeated. The travel of the press is adjusted to account for the added thickness of the second adhesive and carbon—carbon layers, and the pressing process is repeated. The faced metal ring is then removed and placed in an oven while being under minimal constraint to fully cure the adhesive.

After cure of the adhesive, the ring is placed in a surface grinder to remove the external surface layer, which consists mostly of deposited pyrolytic carbon, of the carbon—carbon after which grooves of a desired shape, depth, and width are cut into the surface. The grinding and grooving operations are repeated on the second side of the ring. The ring is now ready for use in a wet power transmission device.

EXAMPLE II

A polyacrylonitrile fiber carbonaceous needled felt material having an areal weight of 13 ounces per square yard is cut into 4 ft. by 8 ft. sheets. These sheets are then interleaved with a 0.010 inch thick nitrile phenolic sheets of similar size having carbonaceous fillers such as is available from BFGoodrich Adhesive Systems Division. The layered sheets are then molded under 150 psi and 350° F. for a period of one hour which resulted in a solid and infusible laminate having a thickness of about 0.020 inches per layer of felt and resin combined. One or more layers may be used depending upon the total thickness desired.

The laminate is then placed in an automated stamping device which has a die that cut rings having an outside diameter of 3.0 inches and an inside diameter of 2.0 inches. During each stamping cycle, the sheet Is indexed and moved the required direction and dislocation until the maximum number of rings were stamped from the sheet.

These rings are then stacked into a holding tool with 375 rings in each stack. Pressure is placed on the rings by clamping the stack. Multiple stacks are placed into each tool and multiple tools are then placed into a CVI furnace and heated to about 1100° C. While holding the temperature constant, a mixture of 95% natural gas and 5% propane added is fed into the furnace and carbon is deposited into the pores created by carbonization of the matrix resin during the heat up cycle. The gas is fed for a period of 100 hours after which the furnace is cooled and the tools are unloaded. The rings are weighed and are found to have increased in weight by 25% and have attained a density of 1.45 gm/cc.

Each ring is then fed through an automated grinder system which removes the external surface layer deposited on both surfaces and brings the total thickness and parallelism within a tolerance of less than 0.001".

A metal ring, which may have gear teeth on the O.D. or I.D., is stamped from a steel sheet. The steel sheet has been previously coated with a nitrile phenolic film adhesive, such as is available from BFGoodrich Adhesive Systems. The carbon—carbon rings are placed on both sides of the adhesive coated metal ring. A press (at 100 psi) is used to compress the carbon—carbon onto the adhesive. The faced metal ring is then removed and placed in an oven while being under minimal constraint to fully cure the adhesive.

The final grinding operation is omitted as the surface has been previously ground.

EXAMPLE III

Example III is identical to Example I with the exception that 50% by volume of the carbon black is displaced with 1200 mesh size silicon carbide particles.

It has been found that the silicon carbide in a carbon—carbon composite raises the static and dynamic coefficient of friction.

EXAMPLE IV

A continuous, 48,000 (48K) filament PAN fabric, plain weave construction, is woven in a 2×2 pick count weave. A phenolic resin from Borden, known as SC-1008 was mixed with carbon black in a ratio of 75 weight percent resin solids to 25 percent carbon black. The resin/carbon black is placed on the fabric by a process known as prepregging. The resin is heated to advance the cure of the resin and to produce a material which is easily handled. The prepreg material is then cut into 4 foot by 8 foot sheets and multiple layers of the sheets are molded into a composite. The molding is accomplished by applying a pressure of 100 psi and a temperature of 350° F. for a period of one hour which resulted in a solid and infusible laminate having a thickness of 0.018 inches per layer of prepreg.

Multiple layers of laminate are then placed under a computer controlled water jet cutting tool which cut disks having a 9 inch O.D. and a 6 inch I.D., leaving stock on the outside or inside for machining gear teeth at a later time. These disks are then stacked into a holding tool with 50 layers in each stack. Pressure is placed on the tool by clamping the stack down. Multiple tools are then placed into a CVI furnace and heated to about 1100° C. While holding the temperature constant, natural gas is fed into the furnace and carbon is deposited into the pores created by carbonization of the matrix resin during the initial heat up cycle. The gas is fed for a period of 150 hours after which the furnace is cooled and the tools are unloaded. The annular rings are weighed and are found to increase in weight by 20% and attain a density of about 1.65 gm/cc.

The disks are then surface ground to remove the surface of the carbon—carbon after which grooves of a desired shape, depth, and width are cut into the surface. The grinding and grooving operations are repeated on the second side of the ring. The disk is placed in a machine to cut grooves for engaging loads to gears on the inside or outside of the disk. The disk is now ready for use as a friction element.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A carbon composite, wet friction material comprising carbon fibers or a carbon fabric, carbon char on the carbon fibers or carbon fabric, and pyrolytic carbon on the carbon char, wherein the density of the material is greater than 1.3 g/cc, wherein the carbon char is present in an amount from about 10% to about 30% by weight.

2. The carbon composite of claim 1 wherein the density is from 1.35 to about 1.7.

3. The carbon composite of claim 1 wherein the wet friction material contains less than about 40% voids.

4. The carbon composite of claim 1 wherein the fibers or fabric is derived from a group consisting of polyacrylonitrile fibers, pre-oxidized acrylonitrile fibers, pitch fibers, CVD carbon fibers, pyrolyzed natural fibers and mixtures thereof.

5. The carbon composite of claim 1 wherein carbon char is derived from a carbonaceous material.

6. The carbon composite of claim 5 wherein the carbonaceous material is pitch or a resin.

7. The carbon composite of claim 5 wherein the carbonaceous material contains a carbonaceous filler.

8. The carbon composite of claim 7 wherein the carbonaceous material contains at least one member selected from the group consisting of carbon black, graphite, pitch particles, metallurgical coke and needle coke.

9. The carbon composite of claim 5 wherein the carbonaceous material contains a ceramic filler.

10. The carbon composite of claim 9 wherein the carbonaceous material contains at least one member selected from the group consisting of boron carbide, silicon carbide, silicon nitride, zirconium oxide, and aluminum oxide.

11. The carbon composite of claim 1 wherein the carbon material is laminated.

12. The carbon composite of claim 1 wherein the wet friction material contains from about 20% to about 50% fiber volume.

13. The carbon composite of claim 12 wherein the carbon composite contains less than about 40% voids.

14. A wet friction material prepared by the process comprising the steps of impregnating carbon preforms or fabrics with from about 20% to about 50% by weight of a carbonaceous material, curing the impregnated carbon preform or fabric, and densifying the cured carbon preform or fabric by chemical vapor deposition, wherein the densification step is continued until the wet friction material has a density greater than 1.3 g/cc.

15. The wet friction material of claim 14 wherein the cured carbon preforms or fabrics are cut into near net shape prior to densification.

16. A wet friction element comprising a metal core bonded to the carbon material of claim 1.

17. A wet friction element comprising a metal core bonded to the carbon material of claim 7.

18. A wet friction element comprising a metal core bonded to the carbon material of claim 9.

19. A power transmission device containing the wet friction article of claim 16.

20. A power transmission device containing the wet friction article of claim 17.

21. A power transmission device containing the wet friction article of claim 18.

22. A wet friction material prepared by the process comprising the steps of impregnating carbon preforms or fabrics with a carbonaceous material containing a ceramic or carbonaceous filler, curing the impregnating carbon preform or fabric to form an intermediate structure, cutting the cured carbon preform or fabric into near net shape and densifying the shape by chemical vapor deposition, wherein the densification step is continued until the wet friction material has a density greater than 1.3 g/cc.

23. The wet friction material of claim 22 wherein the wet friction material contains from about 20% to a 50% fiber volume, from about 10% to about 30% by weight carbon char and less than about 40% voids.

24. A carbon composite, wet friction material comprising carbon fibers or carbon fabric, carbon char on the carbon fibers or fabric, and pyrolytic carbon on the carbon char, wherein the density of the material is greater than 1.3 g/cc, the fiber volume content is from about 20% to about 50%, and the carbon char content is from about 10% to about 30% by weight.

25. The carbon composite of claim 1 wherein the voids are interconnected and few voids extend through the composite and pass light.

* * * * *